Aug. 28, 1923.

J. W. TAYLOR 1,466,415

MACHINE FOR MAKING WIRE FABRIC

Filed Jan. 21, 1922

Inventor:-
John William Taylor.
By his Attorney:- Walter Gunn

Aug. 28, 1923.

J. W. TAYLOR 1,466,415

MACHINE FOR MAKING WIRE FABRIC

Filed Jan. 21, 1922

Inventor:
John William Taylor.
By his Attorney: Walter Lunn

Aug. 28, 1923.

J. W. TAYLOR 1,466,415

MACHINE FOR MAKING WIRE FABRIC

Filed Jan. 21, 1922    11 Sheets-Sheet 5

Fig. 5.

Inventor:
John William Taylor.
By his Attorney: Walter Gunn

Aug. 28, 1923.　　　　　　　　　　　　　　　　1,466,415
J. W. TAYLOR
MACHINE FOR MAKING WIRE FABRIC
Filed Jan. 21, 1922　　　　11 Sheets-Sheet 7

Fig. 7.

Inventor:
John William Taylor.
By his Attorney: Walter Lunn

Aug. 28, 1923.

J. W. TAYLOR 1,466,415

MACHINE FOR MAKING WIRE FABRIC

Filed Jan. 21, 1922

Inventor:
John William Taylor.
By his Attorney: Walter Gunn

Fig. 11.

UNITED STATES PATENT OFFICE.

JOHN WILLIAM TAYLOR, OF PENDLETON, ENGLAND.

MACHINE FOR MAKING WIRE FABRIC.

Application filed January 21, 1922. Serial No. 530,930.

*To all whom it may concern:*

Be it known that I, JOHN WILLIAM TAYLOR, a subject of the King of Great Britain and Ireland, residing at Pendleton, Manchester, England, have invented new and useful Improvements in a Machine for Making Wire Fabric, of which the following is a specification.

This invention relates to wire fabric for fencing, reinforcing concrete, and other purposes, of the kind in which the meshes are formed by a number of longitudinal wires, or rods, and a series of transverse wires or binders engaging the former, and in particular the fabric forming the subject of my British Patent No. 172476 and the object of the invention is the continuous weaving or production of said fabric by mechanical means which may be automatic, or semi-automatic.

In the continuous weaving or production of the said fabric the necessary main operations are the feeding forward of the longitudinal wires, lying parallel with each other and at the required distances apart, by suitable feeding mechanism, which carries them forward intermittently a distance agreeing with the required pitch of the transverse wires, then delivering the transverse or binder wires above and below the longitudinal wires, then coiling or twisting said binder wires upon themselves and across the longitudinal wires, and then again feeding forward the longitudinal wires, together with the fixed binder wires, the required distance, when the next succeeding binder wires are applied, and so on continuously.

In making the said fabric by hand it is usual to effect the twisting of the binder wires by means of hand operated tongs, which grip the binder wires, and are themselves rotated whilst gripping the wires. When the binder wires are twisted in opposite directions to right and left of each longitudinal wire, two pairs of tongs are used, one rotated in one direction and the other in the reverse direction. In each case the tongs rotate about an imaginary axis, and after twisting the wires, are free to leave the wires laterally. In a machine for mechanically and automatically twisting the binder wires and allowing of the continuous production of the fabric the same, or similar conditions must obtain; that is, to say, the twisting means must be such as to allow of the binder wires, after being twisted, passing forward out of engagement therewith, and offering no obstruction to the movements of the fabric.

In order to allow of the twisting of the binder wires without unduly shortening the same, and also to allow of a close fit, of said wires on the longitudinal wires (especially if of large diameter) it is desirable that the binder wires should be slightly crimped prior to being applied to the longitudinal wires, the crimps coming opposite the said wires.

The machine forming the subject of this invention embodies improved means whereby the several operations before named can be carried out in a simple, effective and reliable manner, and also whereby the said conditions respecting the twisting of the binder wires are observed, and whereby the binder wires are crimped prior to being applied to the longitudinal wires.

According to the invention, the improved machine is characterized by the following essential features, viz: a frame, at one part or end of which is arranged a slay or other suitable mechanism for automatically feeding the longitudinal wires through the machine, or to the binder wire twisting mechanism, said feed mechanism being operated intermittently from a power shaft also forming part of the machine; and arrangement of slotted twisting wheels, which are preferably without any shaft, stud or spindle or hub bearing, and a series of gear wheels, between which the twisting wheels are suspended, the said gear wheels, on being rotated, rotating the twisting wheels, there being a set of wheels for each length of the binder wires between the longitudinal wires and those portions of the binder wires beyond the outer longitudinal wires; an arrangement of mechanism for feeding the binder wires above and below and across the longitudinal wires and severing such wires, after each feeding operation to the correct length; means for carrying said binder wires laterally into the slots of the twisting wheels (the slot of each wheel extending from its periphery to a point slightly beyond the centre of the wheels); means for engaging the newly twisted binder wires and acting in synchronism with the aforesaid mechanism for feeding the longitudinal wires to advance the fabric through the machine for a distance equal to the required pitch of the binder wires; and means at the delivery end of the machine for wrapping the finish fabric into a coil, ready for removal, when the required length of fabric is produced. Any suitable straining or tension devices will be provided at the forward end of the machine for straightening the longitudinal wires as they pass into the machine, and at the side of the machine similar devices will be provided for straightening the binder wires. The said mechanism for delivering the binder wires to the machine may include means for crimping the binder wires, in which case the straining or tensioning devices will operate on the wires before they are crimped.

The invention will be further described with reference to the accompanying drawings, wherein:—

Figs. 5 and 6 illustrate plan views of the right-hand and left-hand sides respectively of that portion of the machine shown in elevation in Fig. 3. In Fig. 5 certain parts are shown broken away in order to show the feed mechanism of the bottom binder wires, and Fig. 6 showing the feed mechanism of the top binder wires.

Fig. 6a illustrates a part sectional elevation of a detail hereinafter described.

Fig. 6b is an elevation of a further detail hereinafter described.

Figure 3:
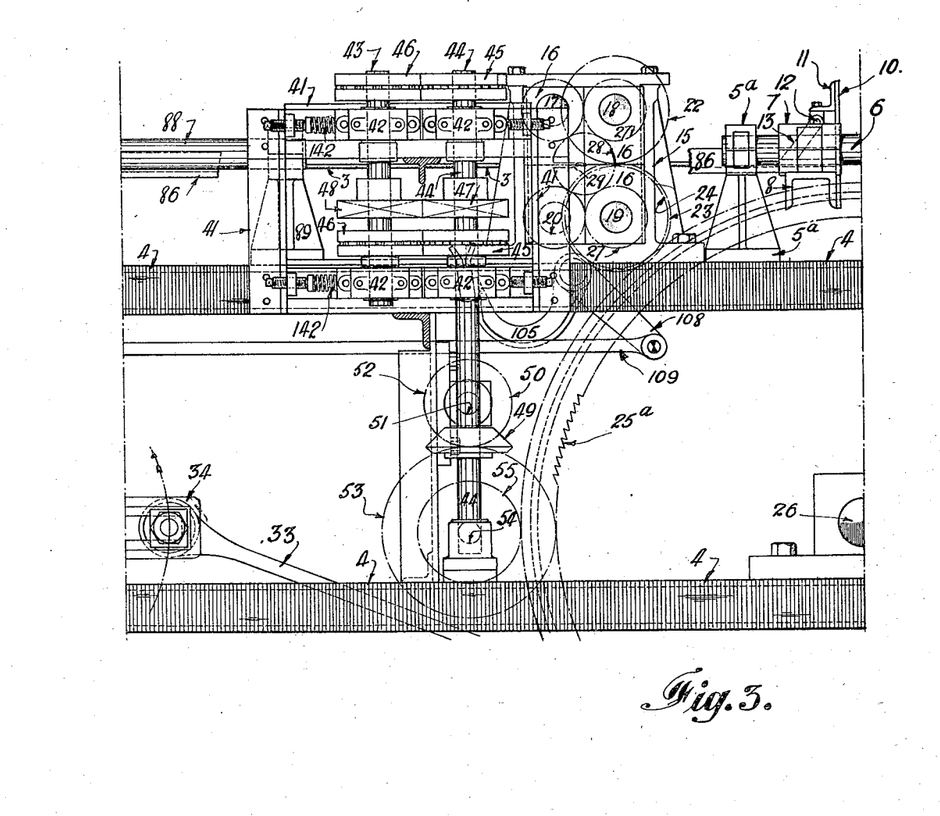
Figure 4:
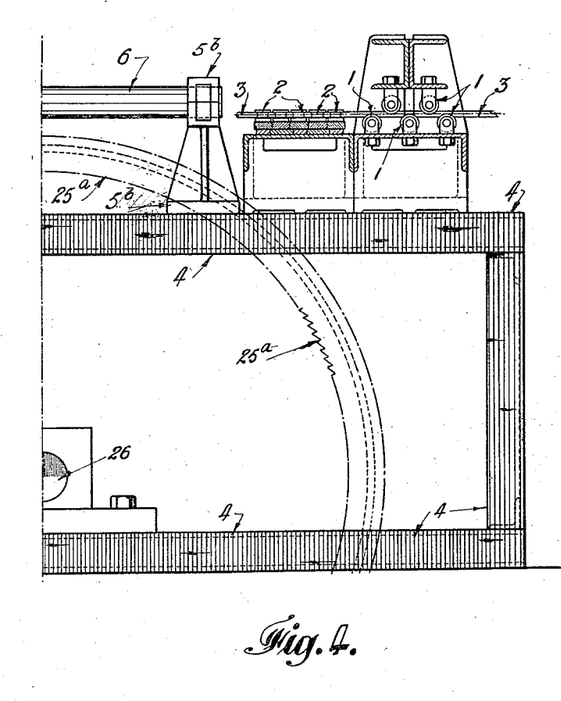

Referring to Fig. 4, the arrangement of straining devices therein shown is of the ordinary construction, and comprises horizontally disposed adjustable guide rollers 1, and vertically disposed adjustable guide rollers 2, the longitudinal wires 3 of the intended wire fabric, passing between the said rollers as they enter the machine. Said straining devices are carried by the machine frames 4. Upon the said frames and on each side of the machine is also mounted a pair of brackets 5a, 5b, see Figs. 3 and 4, and carried by such brackets is a guide rod 6 whereon is slidably mounted a sleeve 7. Secured at one end to the sleeve 7 on the guide rod 6 on one side of the machine and secured at the other end to the like sleeve on the guide rod on the other side of the machine is a channel iron bar 8, see Figs. 3, 5 and 6. Upon such bar is fitted a plate or bolster 9 in the upper face of which is found a number of grooves, one for each longitudinal wire 3 of the fabric to lie in as it passes through the machine. Fitted to the said bar is also a number of upright metal strips 10, to which at their upper ends is, in turn, connected to an angle iron bar 11, see Fig. 6a. From the bar 11 is supported the axle 12 of a series of pawls or dogs 13, which lie at an angle to the vertical and at their free ends are grooved, to fit the upper half of the longitudinal wires 3, each dog being fixed on the axle 12, so that by means of a handle 14 the dogs 13 may, when so required, all be raised clear of the wires 3. The strips 10 lie at a distance apart, in order to leave room for the wires 3 to pass. The arrangement of slide rods, sleeves, cross bar, and dogs, collectively form what is hereinafter called the "slay," and the manner in which it is operated is hereinafter described.

Upon each side of the frame 4, is also mounted a large bearing bracket or housing 15, in which are arranged a series of four bearing blocks 16, in which are journaled the shafts 17, 18, 19, 20. These shafts extend across the machine from bearing block to bearing block, and on each shaft at one end is a spur wheel 21, the several wheels being of even size and those on the top shafts 17, 18 meshing with each other and those on the bottom shafts 19, 20 also meshing with each other. Upon the shafts 18 and 19 are two further spur wheels 22, 23 also of uniform size and meshing with each other. Upon the shaft 19 is a further wheel 24 which meshes with a large toothed wheel 25 carried loosely on a shaft 26, journaled in bearings on the frame 4, see Figs. 3 and 5, the wheels 22, 23, 24 and 25 lying outside the frame of the machine, while the wheels 21, lie inside the frame, see Fig. 5.

Keyed upon each of the shafts 17, 18, 19 and 20 is a series of flanged gear wheels 27, spaced apart for a distance equal to twice the pitch of the longitudinal wires 3. Further, the said wheels are arranged so that the flanged wheels on the shaft 17 lie in the same plane as the like wheels on the shaft 19, and the flanged wheels on the shaft 18 lie in the same plane as the wheels on the shaft 20, these latter also lying in a plane half-way between the planes of the wheels on the shafts 17 and 19, and the spacing of the several wheels as a whole agreeing with the pitch of the fabric to be produced. By means of the wheels 21, the shafts 17, 19 rotate in the same direction as each other, and similarly the shafts 18, 20 also rotate in the same direction as each other, but while the shafts 17, 19 rotate in one direction the shafts 18, 20 rotate in the opposite direction. Suspended or interposed between each of the pairs of flanged wheels 27 on the shafts 17, 19 and 18, 20 is a slotted twisting wheel 28, see Figure 9. This wheel is formed with gear teeth by which it meshes with and is rotated by the flanged wheels 27, said wheels 28 having no axle or hub bearing and depending for its support on the inter-engagement of its teeth with those of the wheels 27 and on the equal movement of said wheels. It is also formed with a slot 29 which extends from the periphery of the wheel to a point slightly beyond the centre of the wheel. Such slot with the wheels in the normal position lies horizontally and faces the delivery end of the machine.

Figure 8:
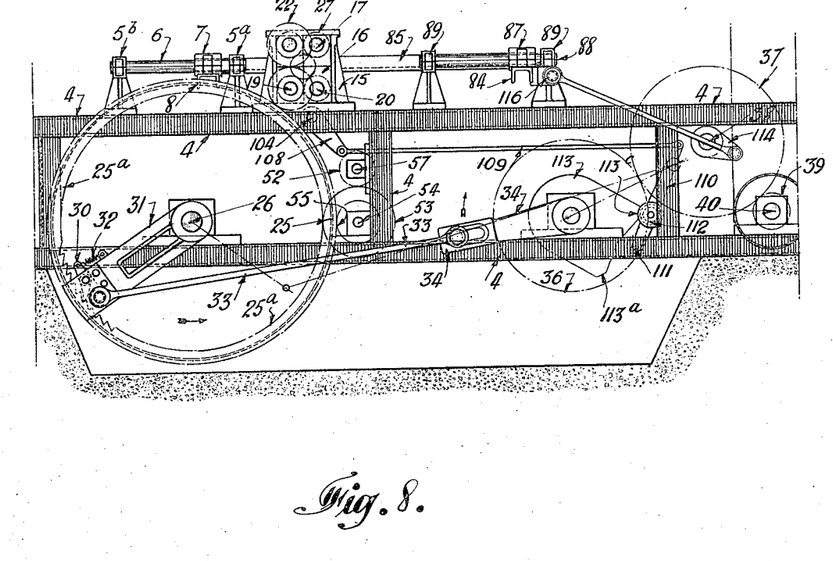
Fig. 8 illustrates a side elevation of the central portion of the right-hand side of the machine, and shows the main driving mechanism, this view being drawn to a smaller scale than Figs. 1 to 7.

The large wheel 25 by which motion is imparted to the wheel 24, receives its motion through the medium of a ratchet pawl 30 carried by a crank 31, secured to the shaft 26, the inner face of the wheel 25 being formed with ratchet teeth 25a, see Fig. 8, with which the pawl 30 engages under the pull of a spring 32. Connected to said crank is a rod 33, which at its other end is connected to a crank 34, secured to a shaft 35. Keyed on this latter is a gear wheel 36, which meshes with a wheel 37 (of the same diameter) on a shaft 38, said wheel 37 also meshing with a pinion 39 on the main driving shaft 40. The action and timing of the gears will be fully explained when the general operations of the machine are described.

The mechanism for feeding the binder wires into the machine is as follows: Upon the left hand side of the machine is an upstanding frame 41, whereon are mounted the bearings 42 of a pair of shafts 43, 44 on one of which are keyed two female crimping rollers 45, and on the other of which are keyed two male crimping rollers 46. Also upon said shafts are keyed spur wheels 47, which mesh with each other and thereby cause the rotation of the wheels 45 to be in the reverse direction to that of the wheels 46. The shaft 44 extends downwards and is fitted with a bevel wheel 49 which meshes with a further bevel wheel 50 on a cross shaft 51, whereon (at the other side of the machine) is a spur wheel 52, which meshes with a wheel 53, carried on a spindle 54, on which is a pinion 55 meshing with the large wheel 25.

Extending across the machine (see Figs. 5, 6 and 9) are channel iron bars 56, 57. Upon the upper bar 56 is fixed a bolster plate 58, upon which in turn slidably rests a bar 59, formed on its underside with an open ended groove 60. Upon the lower bar 57 is fixed a further bolster plate 61, supporting a further slide bar 62, also formed on its underside with an open ended groove 63. The slide bar 59 is connected by a link 64 to the arm 65 of boss 66 keyed to a shaft 67, carried in bearings 68, supported by the channel iron bar 56. Extending from a further boss 69 keyed to the shaft 67 is an arm 70, at the extremity of which is pivoted a one-way trip lever arm 71, a spring 72 exerting a pull between the pivot connection of said arm and the bar 56, in order normally to hold the slide bar 59 retracted, i. e: with its groove 60 over the face of the bolster 58. Stops 73 on the channel iron 56 limit the backward movement of the slide bar 59. When so retracted the groove 60 in the bar is opposite the point where the upper crimping wheels 45 and 46 mesh or contact with each other. Upon a boss 74 on the shaft 75, carried by a bracket (or brackets) on the lower channel iron bar 57, is an arm 76, connected by link 77 to the lower slide bar 62. Upon a further boss (not seen) on the shaft 75 is an arm 78, which at its extremity is pivotally connected to a link 79, which latter at its upper end is pivotally connected to an arm 80 on a boss 81 loose on the shaft 67. Depending from the boss 81 is a lever arm 82, from which extends a further one-way trip lever 83.

Figure 5:
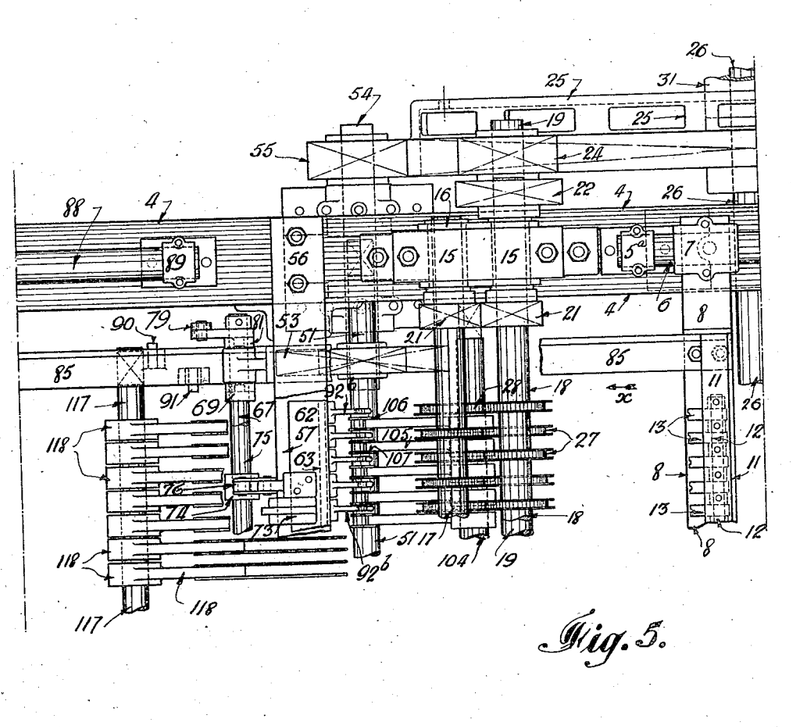
Figures 6, 6A, 6B:
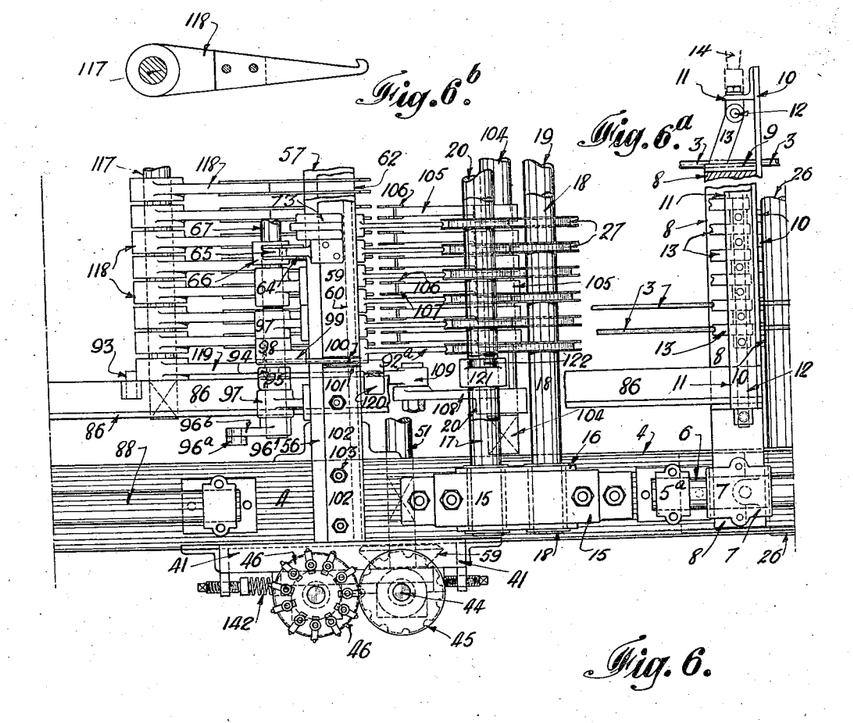
Figure 7:
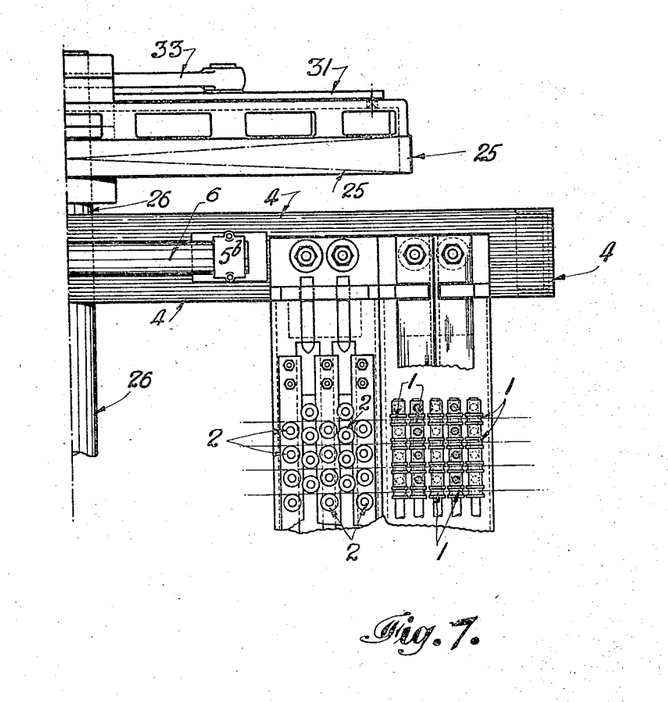
Fig. 7 illustrates a plan of a portion of the right-hand side of the machine, projected from Fig. 4.

Extending longitudinally from the channel iron cross bar 13 of the slay to a like channel iron cross bar 84 at the rear of or beyond the twisting wheel gearing and the said trip levers, are two angle iron bars 85, 86, see Figs. 3, 5 and 6. The channel iron bar 84 is secured to sleeves 87, slidable on guide rods 88 carried in brackets 89 on each side of the machine.

Upon the bar 85 is carried two steel pins 90, 91, projecting to the right and left of the bar 85 respectively and lying in the planes of the trip levers 71, 83, so that on the slay being moved in the direction of the arrow $x$, see Fig. 5, the pin 91 strikes the trip lever 83, and thus moves forward the lower slide bar 62, to bring the groove 63 over the edge of the bolster plate 61. As the slay continues to move in the same direction the pin 90 strikes the trip lever 71 and moves forward the upper slide bar 59, until the groove 60 lies beyond the edge of the bolster 58, see Figure 9. Carried by each of the channel iron bars 56, 57 is a series of inclined guide members 92a and 92b. Those 92b on the lower bar having an upturned part. The purpose of said guide members is hereinafter explained.

Carried by the other angle iron bar 86 is a further steel pin 93, which in one direction of movement of the bar 86 strikes a one-way trip lever 94, carried from the arm of a boss 95, keyed to a shaft 96, rotatably mounted in bearing brackets 97, carried by the channel iron bar 56. Keyed to the said shaft 96 is a further boss 98, with an arm 99, to which is secured one of a pair of shear blades, such blades being designated 100, and 101 and the blade 100 being on the arm 99, and the blade 101 being secured to the end of a stationary bar 102, see Fig. 6, which is similar in cross section to the bar 59, but is held fixed by bolts and nuts 103, to the channel iron bar 56.

A similar arrangement of shaft, bosses, shear blades and fixed bar is provided upon the lower channel bar 57, the said further shaft being connected with the shaft 96 through the medium of a link 99ª and lever arms 99ᵇ on the respective shafts so that as the pin 93 acts upon the trip lever 94 to operate the upper pair of shear blades, it also serves to operate the lower pair of shear members.

Figure 9:
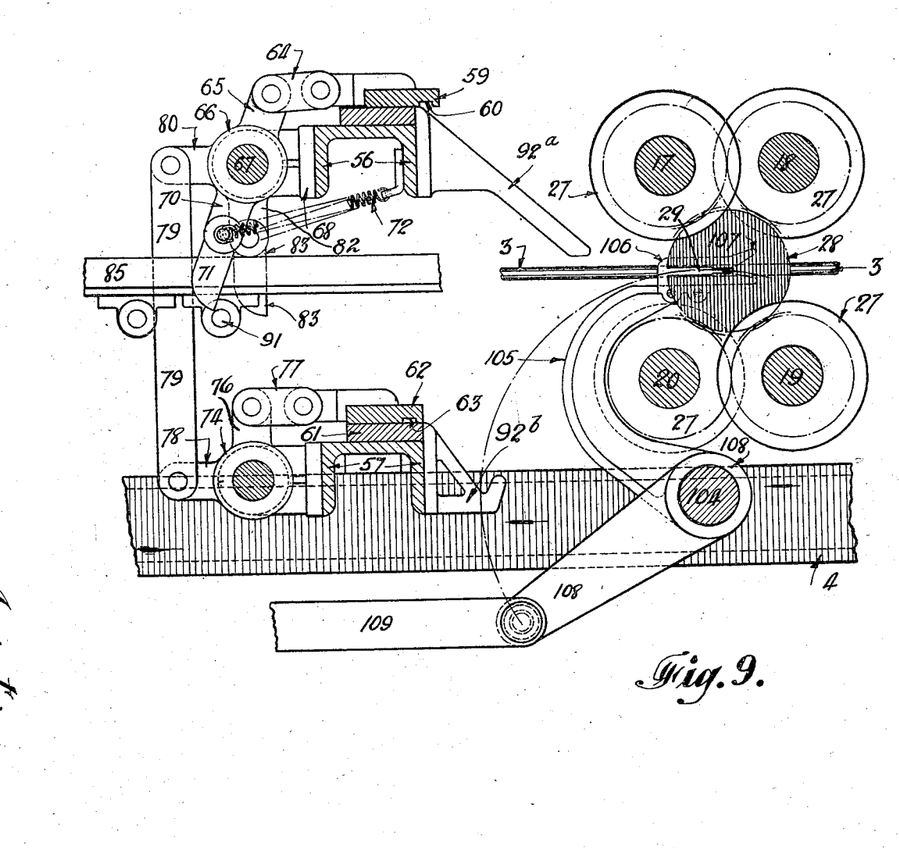
Fig. 9 illustrates (to a larger scale) a sectional elevation of the binder wire twisting mechanism, and of the mechanism for delivering the binder wires into the slots of the twisting wheels.
Figure 10:
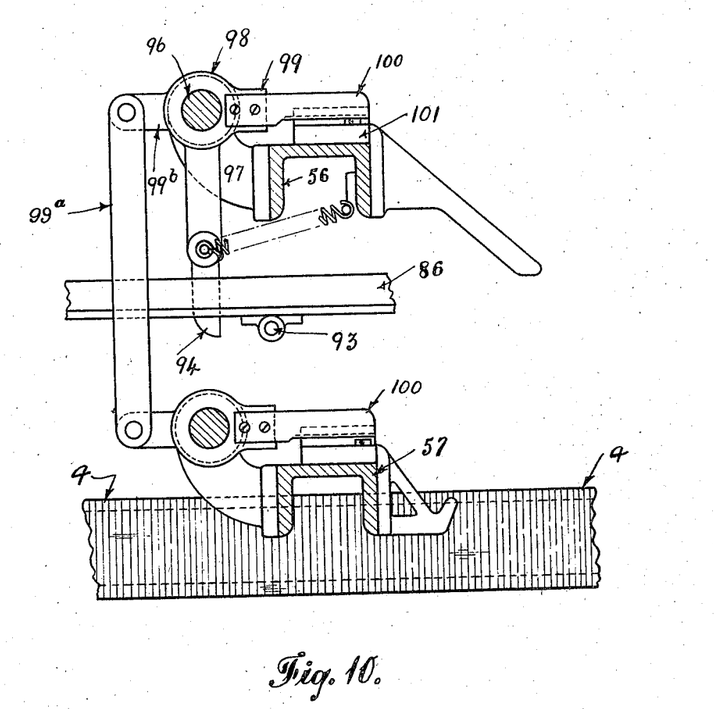
Fig. 10 is a detail elevation of the binder wire shear mechanism.
Figure 11:
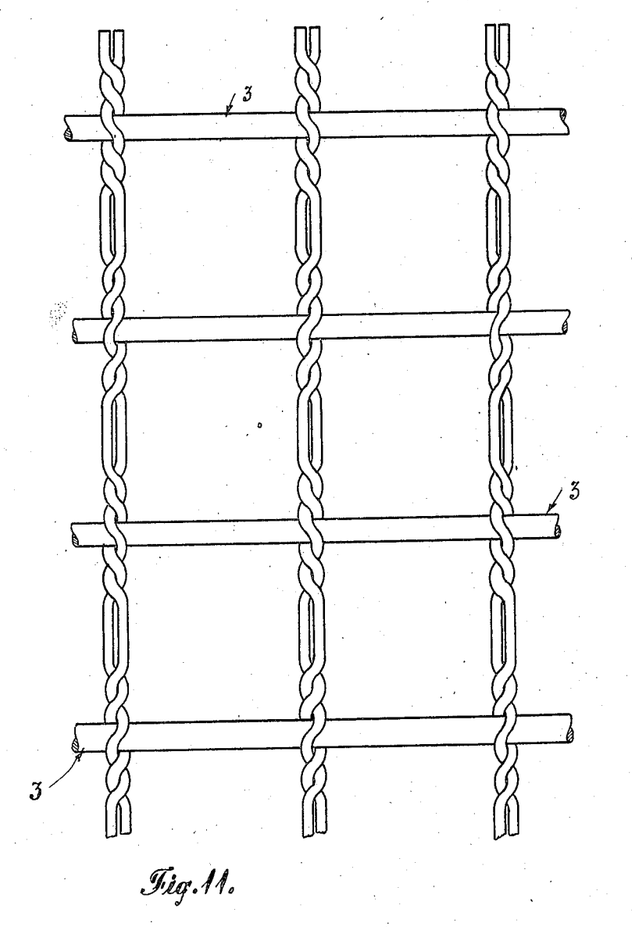
Fig. 11 is a plan of a portion of wire fabric produced by the machine.

Upon a rotatable cross shaft 104 carried by the machine frames 4 is a series of sickle shaped lever arms 105, see Figure 9, preferably one for each length of binder wire between the longitudinal wires 3. At the extremity of each lever arm 105 are two plates 106, 107 which are "duck-bill" shape at one end and lie to right and left of one of the wires 3, the mouth or entrance of the "duck-bill" end facing the inlet end of the machine and lying in the plane of the wires 3 and the slots 29 in the twisting wheels 28, when the lever arm is in its raised position as shown in Figure 9. In such position only sufficient space is left between the bottom of the slot 29 in each wheel 28 and the bottom of the opening of the plates 106, 107 to allow room for binder wires lying side by side.

Secured to the cross shaft 104 is a lever arm 108, to which is pivotally connected the link 109, which latter at its other end is pivotally connected to a lever arm 110 (see Figure 8) journaled on a stud 111, secured to the frame 4. Carried by such lever arm 110 is a roller 112, which owing to the weight of the lever arms 105 always presses against the periphery of a rotary cam 113, mounted upon the shaft 35. Such shaft as previously described receives its motion from the main driving shaft 40 through gear wheels 36, 37, 39. The cam 113 as hereinafter described acts upon the lever arm 110 to raise the sickle shaped lever arms 105, at predetermined intervals and twice in each revolution the first upward movement being the full distance, but the second being only from a point slightly below the wires 3.

The slay aforesaid and the slidably mounted parts connected therewith receive to and fro motion from a crank 114 mounted on the shaft 38 and connected by a rod 115 to a bracket 116 on the channel iron member 84, see Figure 8.

Upon a further shaft 117 carried by the sliding bars 85, 86 is mounted a series of lever arms 118, see Figure 6, and Figure 6ᵇ, each carrying at its free extremity two thin metal plates which extend towards the twisting mechanism and lie to right and left of one of the wires 3, when raised to their highest position. The plates at one end take the shape of a hook, and such hook ends lie immediately in front of the channel iron cross bars 56, 57. These lever arms and plates as hereinafter described, are for the purpose of engaging the binder wires after the latter have been incorporated into the fabric, and to draw the fabric forward at the same time as the slay moves the rods 3 forward. The said arms 118 are keyed to the shaft 117 and are normally held with their hook ends immediately below the level of the rods 3, by means of a further lever arm 119, also keyed to the shaft 117, and at its forward end resting by means of a laterally extending part 120 upon the angle iron bar 86. Upon the shaft 20, is mounted a boss 121, formed with a cam projection 122, which is timed to lie uppermost when the twisting wheels 28 have completed their full rotary motion, and which when in such position lies in the path of the free end of the lever arm 119, and serves to raise such lever arm, and with it the hook ends of the lever arms 118, to a position where the hooks come behind the newly twisted binder wires still lying in the slots of the twisting wheels 28. With the forward or feeding movement of the slay and bars 85, 86, the hook-ended lever arms 118 engage the binder wires and remain so engaged until the slay starts its return movement when said hook ended arms 118 drop back to their original position.

As the fabric is fed forward progressively through the machine, it is simultaneously wrapped on to a take up drum 123, driven in any suitable manner in sympathy with the rate of production and increase in the diameter of the roll of fabric.

Figure 1:
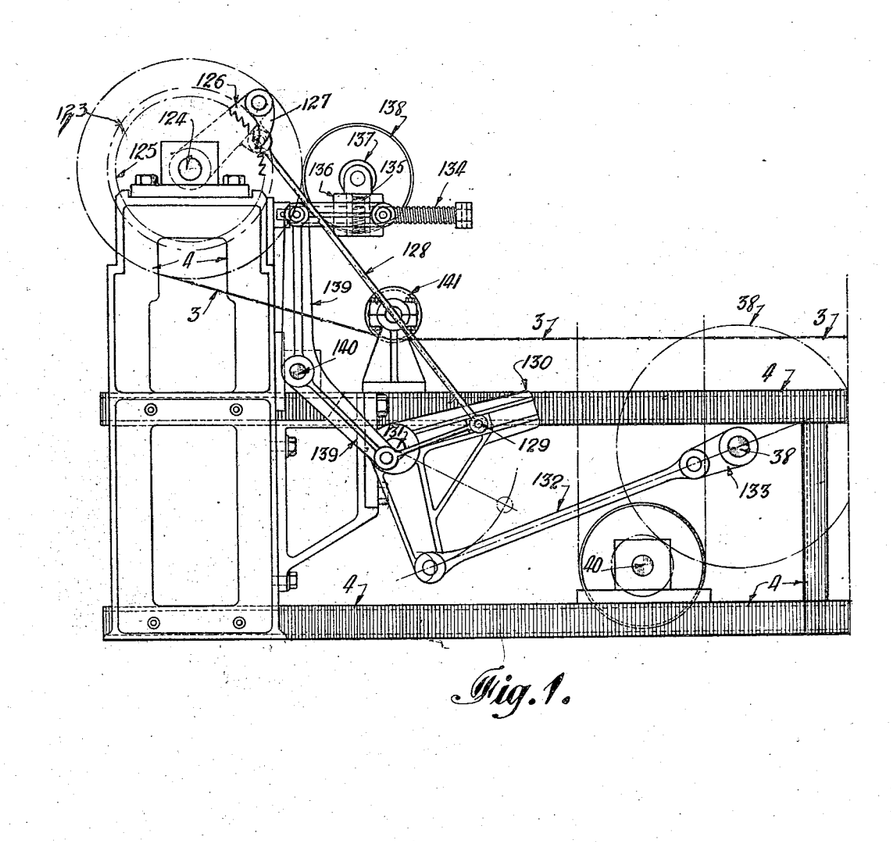
Figs. 1, 2, 3 and 4 illustrate collectively a left hand side elevation of a machine embodying the invention, portions of Fig. 4 being shown in section.
Figure 2:
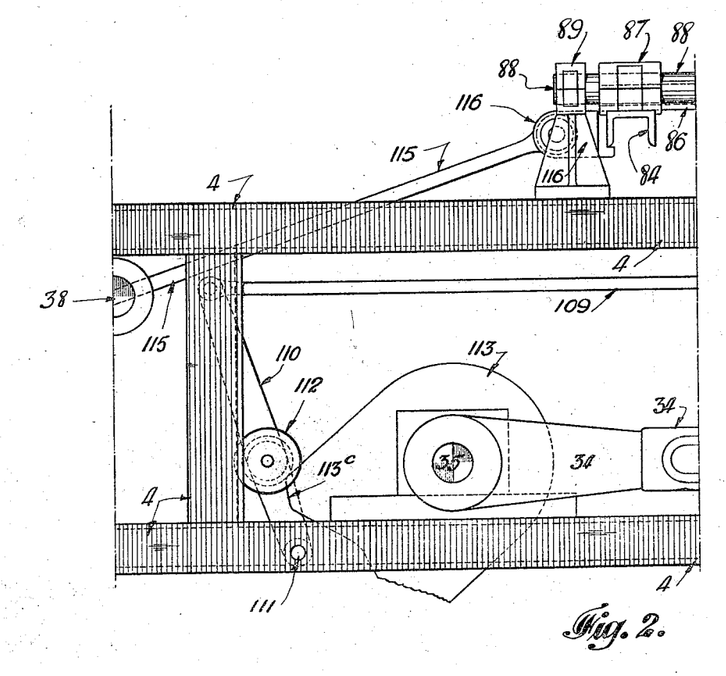

In the arrangement shown (Figure 1) the drum 123 is carried on a shaft 124, on which also is keyed a ratchet wheel 125, and loose upon said shaft is a lever arm 126. A pawl 127 on said lever arm engages the teeth of the ratchet wheel so that with each movement of the lever arm in one direction the drum 123 is advanced. The said lever arm is operated by a rod 128, connected to a slide 129 on one arm of a bell-cranked lever 130 journaled on a shaft 131, supported by the machine frame 4. The other arm of said lever is connected by a rod 132 to a crank 133 on that end of the shaft 38 furthest from the crank 114, see Figure 8. In order to vary the angular movement of the drum 123 as the roll of fabric increases in diameter, means are provided for automatically varying the angular movements of the lever arm 126 and pawl 127. In the arrangement shown a stationary screw 134 is provided, on which is mounted a nut 135 enclosed in a bracket 136 and with which gears a wheel 137, the nut and wheel forming skew gears. On the shaft of the wheel 137 is a friction wheel 138, which bears against the roll of fabric, and is rotated by the same. Linked to the bracket 136 is a further lever 139, fulcrumed to the frame 4 at 140, said lever in turn, being linked to the slide 129. As the roll of fabric increases in diameter and rotates the friction wheel 138 the latter is caused by means of the skew wheels to travel along the screw 134, and thereby through the lever 139 bring the slide 129 nearer the fulcrum of the bell crank lever 130, and thereby shorten the angular movement of the lever arm 126, to suit the rate of production of the fabric.

A guide roller 141 may be provided to keep the fabric horizontal until it is about to pass on to the drum 123. The machine will usually be built to suit the widest fabric likely to be required, say 7' 6", but of course, it can be built to narrower widths if desired. Narrower fabrics can be produced in the wider machine by reducing the number of longitudinal rods, and adjusting the binder wire feed mechanism to suit.

The operations of the complete machine may be described as follows:

Assuming the longitudinal wires 3, of the required number and gauge have been threaded into the machine to a point beyond the twisting wheels 28 and the dogs 13 lowered on to the said wires, and also with the binder wires threaded through the crimping rollers 45 and 46 and up to the shear blades, and assuming also that the slay and its associated parts are advanced to a position nearest the delivery end of the machine in which position the grooves in the slide bars 59 and 62 are opposite the grooves in the fixed bars, 102, 102, the driving shaft 40 is set in motion.

As the said driving shaft revolves, the slay and its associated parts moves towards the inlet end of the machine, such movement being imparted to the slay through the crank 114 and connecting rod 115, and during such movement the projecting pins 90, 91 and 93 pass and raise their respective trip levers, without operating the binder wire feed and shear mechanism. Also during the backward movement of the slay the large wheel 25 is rotated for a portion of a revolution by means of the crank arms 31, 34 connecting rod 33 and pawl 30, said large wheel, in turn rotating the binder wire crimping wheels 45 and 46 through the medium of the cross shaft 51 and interposed gearing, and by the time the slay has reached the end of its stroke, there is a length of crimped binder wire lying in each of the grooves 60, 63 of the slide bars 58, 62 and further all the slots 29 of the twisting wheels 28 face the delivery end of the machine and the cam 122 is uppermost on the boss 121.

The slay now commences its forward movement towards the delivery end of the machine, i. e. in the direction of the arrow $x$, see Figure 5, owing to the continued revolution of the shafts 38 and 40, and after travelling a short distance the pin 93 on the longitudinal bar 86 strikes the one-way trip lever 94, and, as the slay advances, rocks the lever arm 99$^b$ to operate the upper and lower shear mechanism and sever the binder wires in the grooves 60, 63 from the binder wire in the fixed bars 102. As the slay continues to advance, the pin 93 releases the trip lever 94 and the pin 91 on the longitudinal bar 85 now strikes the one-way trip lever 83, and by means of the interposed levers and links moves forward the lower slide bar 62 until the groove 63 lies beyond the edge of the channel iron bar 57, when the binder wire in such groove slides down the inclined guide members 92$^b$ and rests in the cradles formed by the upturned ends of such guide members.

Simultaneously with the forward movement of the slay, the shaft 35 and with it the cam 113, rotates and immediately after the lower binder wire has come to rest in the beforementioned cradles, the roller 112 on the lever arm 110 rides up the part 113$^a$ of the cam 113 thus rocking the lever arm 110 and by means of the rod 109 and lever arm 108 raising the sickle shaped levers 105 to their highest position as shown in Figure 9, the "duck-bill" ends of these latter passing between the inclined guides 92$^b$ and carrying the binder wire therein into the slots 29 of the twisting wheels 28. Under the further rotation of the cam 113, the roller 112 on the lever arm 110 owing to the weight of the sickle shaped levers rides down the periphery of the cam to the part 113$^b$, and when in such position the sickle shaped levers lie with their "duck-bill" mouths just below the longitudinal wires 3. By this time the pin 90 on the bar 85, owing to the continued forward movement of the slay has released the trip lever 71 (which regains its normal position under the influence of the spring 72) and the further pin 91 on the same bar strikes the trip lever 83 and by means of the interposed links and levers, moves the upper slide bar 59 forward until the groove 60 lies beyond the edge of the channel iron bar 56 thus allowing the crimped binder wire to slide down the upper series of inclined guide ways 92$^a$ on to the longitudinal wires 3. The sickle shaped lever arms 105 are again raised owing to the part 113$^c$ of the cam operating the roller 112 and lever 110, and the "duck-bill" ends of said lever arms engage the binder wire lying on the wires 3, and convey the same into the slots 29 of the twisting wheels 28 and alongside the bottom binder wire. The arrangement is such that the crimps in the binder wires in both cases come opposite and fit the longitudinal wires 3.

The sickle shaped lever arms 105 now gradually return to their original position and at the same time the large wheel 25 commences to rotate for its predetermined portion of a revolution the said wheel 25 imparting motion to the twisting wheels 29 through the medium of the beforementioned gearing, the preferred arrangement being such as to give two revolutions to the twisting wheels. Simultaneously with the twisting operation the binder wire crimping mechanism is in operation, feeding a length of crimped wire into the grooves 60 and 63 as before described, and further the slay is on the return movement towards the inner end of the machine and carrying with it the dogs 13 and hook-ended lever arms 118. By the time that the twisting wheels have completed the required number of revolutions and the slots 29 are again facing the delivery end of the machine, the end 120 of the lever 119 has mounted the cam 122 and raised the hook ends of the levers 118 to their highest position and immediately in front of the newly twisted binder wires so that on the slay again moving forward the said hook ends engage the newly twisted binder wires and draw the fabric through the machine, the dogs 13 gripping and feeding the longitudinal wires 3 at the same time.

The take up mechanism at the delivery end of the machine will be arranged to operate in synchronism with the feed mechanism, that is, the lever arm 126 and pawl 127 will rotate the take-up drum 123 during the forward or feed stroke of the slay and the cycle of operations will be repeated continuously, the binder wire shear and feed mechanism operating on each forward stroke of the slay and the crimping and twisting operations taking place during each return stroke of the slay.

The projections on the male crimping rollers are adjustable in and out of said roller in order to vary the depth of the crimps produced. If desired, the said crimping rollers may, as shown in Figure 3, be yieldingly kept in contact by means of springs 142 in order to allow for any irregularities in the diameter of the binder wires, also, if desired, the crimping rollers may be covered with leather or the like in order to effect a more positive feed.

When the longitudinal wires 3 are of comparatively small diameter the crimping wheels may be dispensed with.

If desired the binder wire feed mechanism may be made to feed both the upper and lower binder wires to the slots of the twisting wheels at the same time, a convenient way of effecting this being to place the pins 90 and 91 in a position on the bar 85 to operate both the bars 59 and 62 at the same time, and to substitute a single action cam for the cam 113.

Whilst the dogs 13 have been described as being secured to their axle 12, they may be loose thereon and may each be provided with a handle as shown dotted in Figure 6ª.

When it is desired to manufacture a narrow width fabric on the wider machine, the wheel 52 on the spindle 53 will be replaced by a wheel of smaller diameter thus reducing the number of revolutions of the crimping wheels and effecting a reduced feed of binder wire across the longitudinal wires.

To vary the pitch of the binder wires the throw of the crank 133 is varied. The pitch of the longitudinal wires 3 will usually be constant for each machine but can be varied by leaving out alternate longitudinal wires. In the case of binder wires requiring to be coiled or twisted in one direction only, the flanged gear wheels 27 will all be mounted on the shafts 17 and 19, or the shafts 18, 20.

Instead of the wheels 27 having flanges, the slotted twisting wheels may have flanges, which serve to keep the wheels always in the same plane. Instead also of all the twisting and carrier wheels rotating at the same speed, the end sets of wheels may be rotated at a quicker speed, i. e., make three complete rotations while the others are making two rotations, thereby putting a greater amount of twist in those parts of the binder wires beyond the outer longitudinal wires than in the other parts.

While the machine is chiefly applicable in the manufacture of the fabric described in my said British patent, it will be understood that it can be employed in the manufacture of any similar fabric, i. e., a fabric in which binder wires are twisted together helically and across the longitudinal wires.

What I claim is:—

1. A machine for use in the manufacture of wire fabric of the kind composed of longitudinal wires or rods and transverse binder wires helically twisted together and across the longitudinal wires or rods, comprising a series of rotary gear disks or wheels having slots extending from the periphery of the wheel to a point slightly beyond the center of the wheel, said wheels being spaced apart and arranged between the longitudinal wires of the intended fabric, means for carrying or placing binder wires lying above and below the longitudinal wires laterally into the slots of the said slotted disks or wheels, and means for intermittently rotating said wheels and holding them when stationary with their slots horizontal and facing the direction from which the binder wires are delivered to them, substantially as herein set forth.

2. A machine for use in the manufacture of wire fabric of the kind composed of longitudinal wires or rods and transverse binder wires helically twisted together and across the longitudinal wires or rods, comprising a series of rotary spur-gear disks or wheels having slots extending from the periphery of the wheel to a point slightly beyond the center of the wheel, a series of further spur-gear wheels, two for each slotted wheel, between which said slotted disks or wheels are mounted and by which they are rotated, said further wheels of each set being always rotated in the same direction and said sets of wheels being spaced apart and arranged between the longitudinal wires of the intended fabric, means for carrying or placing binder wires, lying above and below the longitudinal wires, laterally into the slots of the said slotted disks or wheels, and means for intermittently rotating said wheels and holding them when stationary with their slots horizontal and facing the direction from which the binder wires are delivered to them, substantially as herein set forth.

3. In a machine for use in the manufacture of wire fabric of the kind composed of longitudinal wires or rods and transverse wires helically twisted together and across the longitudinal wires or rods, a series of slotted spur-gear disks or wheels supported entirely by a series of further spur-gear wheels, mounted on rotary shafts, and two to each slotted wheel, means for keeping the wheels of each set in the same plane, and means for rotating said further gear wheels of each set in the same direction and at the same speed, and said set of wheels being arranged between the longitudinal wires of the fabric, substantially as herein set forth.

4. In a machine for use in the manufacture of wire fabric of the kind composed of longitudinal wires or rods and transverse wires helically coiled together and across the longitudinal wires or rods, a series of slotted spur-gear disks or wheels supported entirely by a series of further spur-gear wheels, mounted on rotary shafts, and two to each slotted wheel, means for keeping the wheels of each set in the same plane, and means for rotating said further gear wheels of each set in the same direction and at the same speed, and a set of wheels being arranged to right and left of each longitudinal wire or rod passing through the machine, substantially as herein set forth.

5. In a machine for use in the manufacture of wire fabric of the kind composed of longitudinal wires or rods and transverse wires helically coiled together and across the longitudinal wires or rods, a series of slotted spur-gear disks or wheels supported entirely by a series of further spur-gear wheels, mounted on rotary shafts, and two to each slotted wheel, means for keeping the wheels of each set in the same plane, and means for rotating said further gear wheels of each set in the same direction and at the same speed, the slotted twisting disks or wheels being rotated in a direction opposite to the direction in which the next twisting wheels are rotated, whereby the binder wires between any two adjacent longitudinal wires are twisted together, the helix on each side of the said wires or rods running in the same direction, substantially as herein set forth.

6. A machine for use in the manufacture of wire fabric of the kind composed of longitudinal wires or rods and transverse binder wires, helically coiled together and across the longitudinal wires or rods, comprising sets of slotted gear wheels and carrier gear wheels spaced apart to lie between the longitudinal wires of the intended fabric, means for advancing the longitudinal wires through the machine, means for feeding binder wires across and above and below the longitudinal wires, means for carrying the binder wires laterally into the slots of the slotted wheels, means for periodically rotating the alternate slotted wheels in opposite directions, and means for moving the feeding mechanisms of the longitudinal and binder wires intermittently and in proper synchronism so as to produce the finished fabric continuously, substantially as herein set forth.

7. A machine for use in the manufacture of wire fabric of the kind composed of longitudinal wires or rods and transverse binder wires, helically coiled together and across the longitudinal wires or rods, comprising sets of slotted gear wheels and carrier gear wheels spaced apart to lie between the longitudinal wires of the intended fabric, a slay for feeding the longitudinal wires or rods endwise and reciprocated to and fro by mechanism driven from the main driving shaft of the machine, said slay comprising pawls or dogs pivotally supported above the rods and shaped to grip the same when the slay is moved in one direction only, said slay lying nearest the inlet end of the machine and in advance of the slotted wheels, and said slay having an extension extending beyond the slotted wheels and carrying a series of lever arms each with a hook-like extremity and adapted normally to lie below the plane of the fabric, said extension also carrying a further lever arm adapted to engage a cam projection on a rotary cross shaft in the machine frame when the slay is moved backward, and raise the hook ends of the lever arms into the plane of the fabric and behind the newly twisted binder wires and draw the fabric forward with the next advance of the slay, means for feeding binder wires across and above and below the longitudinal wires, means for carrying the binder wires laterally into the slots of the slotted wheels, means for periodically rotating the alternate slotted wheels in opposite directions, and means for moving the feeding mechanisms of the longitudinal and binder wires intermittently and in proper synchronism so as to produce the finished fabric continuously, substantially as herein set forth.

8. A machine for use in the manufacture of wire fabric of the kind composed of longitudinal wires or rods and transverse binder wires helically twisted together and across the longitudinal wires or rods, comprising a series of rotary gear disks or wheels having slots extending from the periphery of the wheel to a point slightly beyond the center of the wheel, said wheels being spaced apart and arranged between the longitudinal wires of the intended fabric, a cross shaft mounted in the frame, whereon is a series of lever arms, the extremities of which are fitted with plates with one end of duck-bill shape, in combination with a cam for causing said levers to move up twice in one rotation of the cam, and carry first one and then the other of the binder wires into the slots of the twisting wheels, and means for intermittently rotating said wheels and holding them when stationary with their slots horizontal and facing the direction from which the binder wires are delivered to them, substantially as herein set forth.

9. A machine for use in the manufacture of wire fabric of the kind composed of longitudinal wires or rods and transverse binder wires helically twisted together and across the longitudinal wires or rods, comprising a series of rotary gear disks or wheels having slots extending from the periphery of the wheel to a point slightly beyond the center of the wheel, said wheels being spaced apart and arranged between the longitudinal wires of the intended fabric, a pair of transverse supports extending across the machine frame and each carrying a sliding plate formed with a groove, and normally held retracted to lie in line with a further and fixed plate having a like groove, means operated by the slay or slay extension, whereby each sliding plate is periodically moved to a position where its groove becomes uncovered and delivers a binder wire, previously threaded therein, to the mechanism for carrying such wires into the slotted wheels, substantially as herein set forth.

10. A machine for use in the manufacture of wire fabric of the kind composed of longitudinal wires or rods and transverse binder wires helically twisted together and across the longitudinal wires or rods, comprising a series of rotary gear disks or wheels having slots extending from the periphery of the wheel to a point slightly beyond the center of the wheel, said wheels being spaced apart, and arranged between the longitudinal wires of the intended fabric, a pair of transverse supports extending across the machine frame and each carrying a sliding plate formed with a groove, and normally held retracted to lie in line with a further and fixed plate having a like groove, means operated by the slay or slay extension, whereby each sliding plate is periodically moved to a position where its groove becomes uncovered and delivers a binder wire, previously threaded therein, to the mechanism for carrying such wires into the slotted wheels, two pairs of crimping wheels or rolls alongside the machine at a point opposite the said grooved cross bars, and means for rotating same and varying the degree of rotation to suit the length of binder wire required, shear members (one fixed and the other movable) applied to each of said transverse supports and fixed bars for severing the binder wires after being fed across the machine, a slay for feeding the longitudinal wires endwise, and means on the slay for operating said movable shear members as the slay moves forwardly, substantially as herein set forth.

11. A machine for use in the manufacture of wire fabric of the kind composed of longitudinal wires or rods and transverse binder wires helically twisted together and across the longitudinal wires or rods, comprising a frame, a pair of rectangular housings on said frame, four bearing blocks in each housing, and four shafts extending across the machine each taking its bearings in one of the blocks in each housing, spur gear wheels on the several shafts, spaced apart at a distance twice the pitch of the longitudinal wires of the intended fabric, and the wheels on two diagonally opposite shafts alternating with those on the other shafts, slotted disk wheels between the said pairs of gear wheels, a further gear wheel on each of said shafts, those on the top shafts meshing with each other and those on the lower shafts meshing with each other, further gear wheels on two of said shafts meshing with each other, a further gear wheel on one of said shafts, and a large wheel alongside the machine frame with ratchet teeth and pawl mechanism for imparting intermittent rotary motion to the said gear wheel, and means for carrying or placing binder wires lying above and below the longitudinal wires laterally into the slots of the said slotted disks or wheels, substantially as herein set forth.

12. A machine for use in the manufacture of wire fabric of the kind composed of longitudinal wires or rods and transverse binder wires helically twisted together and across the longitudinal wires or rods, comprising a frame at one part or end of which is arranged a slay or other suitable mechanism for automatically feeding the longitudinal wires through the machine or to the binder wire twisting mechanism, said feed mechanism being operated intermittently from a power shaft, also forming part of the machine, and an arrangement of slotted twisting wheels and a series of gear wheels between which the twisting wheels are mounted, the said gear wheels on being rotated rotating the twisting wheels, there being a set of wheels for each length of the binder wires between the longitudinal wires, and also for those portions of the binder wires beyond the outer longitudinal wires, an arrangement of mechanism for feeding the binder wires above and below and across the longitudinal wires and severing such wires after each feeding operation to the correct length, means for carrying said binder wires laterally into the slots of the twisting wheels (the slot of each wheel extending from its periphery to a point slightly beyond the center of the wheel), means for engaging the newly-twisted binder wires and acting in synchronism with the aforesaid mechanism for feeding the longitudinal wires to advance the fabric through the machine for a distance equal to the required pitch of the binder wires, and means at the delivery end of the machine for wrapping the finished fabric into a coil ready for removal when the required length of fabric is produced, substantially as herein set forth.

In testimony whereof I have signed my name to this specification.

JOHN WILLIAM TAYLOR.